United States Patent
Garfinkel et al.

(10) Patent No.: US 9,618,409 B2
(45) Date of Patent: Apr. 11, 2017

(54) TEMPERATURE COMPENSATION FOR MONITORING A LOAD BEARING MEMBER

(75) Inventors: Michael Garfinkel, West Hartford, CT (US); Peter Keyo, Canton, CT (US); Peter Liaskas, Norwalk, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 329 days.

(21) Appl. No.: 14/409,485

(22) PCT Filed: Jul. 3, 2012

(86) PCT No.: PCT/US2012/045372
§ 371 (c)(1),
(2), (4) Date: Dec. 19, 2014

(87) PCT Pub. No.: WO2014/007805
PCT Pub. Date: Jan. 9, 2014

(65) Prior Publication Data
US 2015/0330852 A1   Nov. 19, 2015

(51) Int. Cl.
*G01L 5/10*   (2006.01)
*G01R 27/08*   (2006.01)
(Continued)

(52) U.S. Cl.
CPC ............ *G01L 5/10* (2013.01); *B66B 7/062* (2013.01); *B66B 7/1223* (2013.01);
(Continued)

(58) Field of Classification Search
None
See application file for complete search history.

(56) References Cited

U.S. PATENT DOCUMENTS

| 6,392,551 B2 | 5/2002 | De Angelis |
| 6,633,159 B1 | 10/2003 | Robar et al. |

(Continued)

FOREIGN PATENT DOCUMENTS

| DE | 3635518 | 4/1988 |
| DE | 3934654 A1 | 5/1991 |

(Continued)

OTHER PUBLICATIONS

Extended European Search Report for European Application No. 12880627.0, mailed Feb. 2, 2016.
(Continued)

*Primary Examiner* — Daniel S Larkin
*Assistant Examiner* — Jermaine Jenkins
(74) *Attorney, Agent, or Firm* — Carlson, Gaskey & Olds

(57) ABSTRACT

An exemplary system includes a moveable mass. A load bearing member includes at least one electrically conductive tension member that supports a load associated with movement of the mass. An electrically conductive member is situated along a selected portion of a path of movement of the load bearing member. The electrically conductive member is not subject to a load on the tension member. A processor is configured to determine an electrical resistance of the tension member as an indicator of a condition of the tension member. The processor is configured to determine an electrical resistance of the electrically conductive member. The processor uses the determined electrical resistance of the electrically conductive member to compensate for any environmental influence on the determined electrical resistance of the tension member.

20 Claims, 2 Drawing Sheets

(51) Int. Cl.
  *B66B 1/34* (2006.01)
  *B66B 3/00* (2006.01)
  *G01L 1/18* (2006.01)
  *G01L 1/26* (2006.01)
  *B66B 7/06* (2006.01)
  *B66B 7/12* (2006.01)
  *D07B 1/14* (2006.01)
  *D07B 1/22* (2006.01)

(52) U.S. Cl.
  CPC .............. *B66B 7/1246* (2013.01); *G01L 1/18* (2013.01); *G01L 1/26* (2013.01); *D07B 1/145* (2013.01); *D07B 1/22* (2013.01); *D07B 2501/2007* (2013.01)

(56) References Cited

U.S. PATENT DOCUMENTS

| | | | |
|---|---|---|---|
| 6,653,943 B2* | 11/2003 | Lamb | B66B 7/1223 324/513 |
| 7,123,030 B2* | 10/2006 | Robar | B66B 7/1223 187/393 |
| 7,484,598 B2* | 2/2009 | Tyni | B66B 5/0025 187/291 |
| 7,653,506 B2 | 1/2010 | Stucky et al. | |
| 7,801,690 B2 | 9/2010 | Veronesi et al. | |
| 8,424,653 B2* | 4/2013 | Stucky | B66B 7/1223 187/391 |
| 8,813,918 B2* | 8/2014 | Kocher | B66B 7/1223 187/391 |
| 9,327,941 B2* | 5/2016 | Dold | B66B 7/1223 |
| 9,423,369 B2* | 8/2016 | Fargo | B66B 7/1223 |
| 2002/0194935 A1 | 12/2002 | Clarke et al. | |
| 2003/0121729 A1 | 7/2003 | Heinz et al. | |
| 2007/0170012 A1* | 7/2007 | Stucky | B66B 5/0031 187/393 |
| 2007/0173104 A1 | 7/2007 | Veronesi et al. | |
| 2008/0190709 A1 | 8/2008 | Hawkes et al. | |
| 2008/0223668 A1 | 9/2008 | Stucky et al. | |
| 2010/0133046 A1 | 6/2010 | Allwardt et al. | |
| 2011/0148442 A1 | 6/2011 | Berner et al. | |

FOREIGN PATENT DOCUMENTS

| | | |
|---|---|---|
| JP | 06-286957 | 10/1994 |
| JP | 2001-302135 | 10/2001 |

OTHER PUBLICATIONS

International Preliminary Report on Patentability for International application No. PCT/US2012/045372 dated Jan. 15, 2015.
International Search Report and Written Opinion of the International Searching Authority for International application No. PCT/US2012/045372 mailed Jan. 2, 2013.

\* cited by examiner

TEMPERATURE COMPENSATION FOR MONITORING A LOAD BEARING MEMBER

BACKGROUND

This disclosure relates to a monitoring system for a load bearing member, and more particularly to temperature compensation for monitoring a load bearing member, such as a roping arrangement for an elevator system.

Many elevator systems include an elevator car and counterweight suspended by a roping arrangement. The roping arrangement supports the load of the elevator car and facilitates movement of the car. A traction sheave causes movement of the roping arrangement to cause desired movement of the elevator car.

Elevator roping arrangements have included round steel ropes. Monitoring the condition of round steel ropes typically involves a manual, visual inspection. More recently, other types of load bearing members have been included in roping arrangements such as flat belts. With flat belts and other modern load bearing members, tension members may be at least partially encased in a jacket made of a material such as polyurethane. The jacket introduces a need for different inspection techniques.

There have been proposals to use electrical resistance-based inspection techniques for monitoring the condition of the tension members in an elevator load bearing assembly. With such techniques, changes in electrical resistance are interpreted as changes in the strength or load bearing characteristics of the tension member. One aspect of using resistance-based monitoring techniques is that electrical resistance may be influenced by conditions within the elevator hoistway. For example, temperature variations may cause changes in the apparent resistance of a tension member within the hoistway. One technique for addressing factors such as temperature is mentioned in U.S. Pat. No. 6,633,159. That document describes a technique in which the electrical resistance of one tension member within a flat belt is compared to the resistance of another. A possible shortcoming of that approach is that any tension members involved in the comparison are under the tension associated with the load of the elevator car and it may not always be possible to discern changes in resistance resulting from loading and use compared to a change caused by temperature.

SUMMARY

An exemplary system includes a moveable mass. A load bearing member includes at least one electrically conductive tension member that supports a load associated with movement of the mass. An electrically conductive member is situated along a selected portion of a path of movement of the load bearing member. The electrically conductive member is not subject to a load on the tension member. A processor is configured to determine an electrical resistance of the tension member as an indicator of a condition of the tension member. The processor is configured to determine an electrical resistance of the electrically conductive member. The processor uses the determined electrical resistance of the electrically conductive member to compensate for any environmental influence on the determined electrical resistance of the tension member.

In an example embodiment having one or more features of the system of the preceding paragraph, the processor is configured to monitor the electrical resistance of the electrically conductive member over a selected time; determine any environmental influence on monitored electrical resistance during the selected time; and compensate for the determined influence on the determined electrical resistance of the tension member during the selected time.

In an example embodiment having one or more features of the system of any of the preceding paragraphs, the processor is configured to determine a baseline electrical resistance of the electrically conductive member during a first measurement period; determine whether the electrical resistance of the electrically conductive member differs from the baseline electrical resistance during a second measurement period; determine an influence of temperature on the electrical resistance during the second measurement period; determine the electrical resistance of the tension member during the second measurement period; and determine the condition of the tension member during the second measurement period based on the determined electrical resistance of the tension member during the second measurement period and the determined influence of temperature during the second measurement period.

In an example embodiment having one or more features of the system of any of the preceding paragraphs, the electrically conductive member is situated along a wall of a hoistway.

In an example embodiment having one or more features of the system of any of the preceding paragraphs, the electrically conductive member is at least partially secured to a guiderail.

In an example embodiment having one or more features of the system of any of the preceding paragraphs, the electrically conductive member is supported on or in the load bearing member.

In an example embodiment having one or more features of the system of any of the preceding paragraphs, the load bearing member comprises a jacket and the electrically conductive member is received within the jacket.

In an example embodiment having one or more features of the system of any of the preceding paragraphs, the load bearing member comprises a plurality of tension members within the jacket and the electrically conductive member is closer to an edge of the jacket than any of the tension members.

In an example embodiment having one or more features of the system of any of the preceding paragraphs, the tension member has a first stiffness and the electrically conductive member has a second, lesser stiffness.

An exemplary method of monitoring a condition of a load bearing member that includes at least one electrically conductive tension member includes situating an electrically conductive member along a desired length of path of the load bearing member such that the electrically conductive member is not subject to a load on the tension member. An electrical resistance of the tension member is determined as an indicator of a condition of the tension member. An electrical resistance of the electrically conductive member is also determined. The determined electrical resistance of the electrically conductive member is used to compensate for any environmental influence on the determined electrical resistance of the tension member.

An example embodiment having one or more features of the method of the preceding paragraph includes monitoring the electrical resistance of the electrically conductive member over a selected time; determining any environmental influence on the monitored electrical resistance during the selected time; and compensating for the determined influence on the determined electrical resistance of the tension member during the selected time.

An example embodiment having one or more features of the method of any of the preceding paragraphs includes determining a baseline electrical resistance of the electrically conductive member during a first measurement period; determining whether the electrical resistance of the electrically conductive member differs from the baseline electrical resistance during a second measurement period; determining an influence of temperature on the electrical resistance during the second measurement period; determining the electrical resistance of the tension member during the second measurement period; and determining the condition of the tension member during the second measurement period based on the determined electrical resistance of the tension member during the second measurement period and the determined influence of temperature during the second measurement period.

In an example embodiment having one or more features of the method of any of the preceding paragraphs, the situating comprises placing the electrically conductive member along a wall of an elevator hoistway.

In an example embodiment having one or more features of the method of any of the preceding paragraphs, the situating comprises securing the electrically conductive member at least partially to a guiderail in an elevator hoistway.

In an example embodiment having one or more features of the method of any of the preceding paragraphs, the situating comprises including the electrically conductive member on or in the load bearing member.

In an example embodiment having one or more features of the method of any of the preceding paragraphs, the load bearing member comprises a jacket and the electrically conductive member is received within the jacket.

In an example embodiment having one or more features of the method of any of the preceding paragraphs, the load bearing member comprises a plurality of tension members within the jacket and the electrically conductive member is closer to an edge of the jacket than any of the tension members.

In an example embodiment having one or more features of the method of any of the preceding paragraphs, the tension member has a first stiffness and the electrically conductive member has a second, lesser stiffness.

An exemplary assembly for monitoring a condition of a load bearing member includes an electrically conductive member that has a length that allows for the conductive member to be situated along a desired portion of a path of the load bearing member. A connector is configured to make an electrically conductive connection with at least one tension member in the load bearing member. A processor is configured to determine an electrical resistance of the tension member as an indicator of a condition of the tension member. The processor is configured to determine an electrical resistance of the electrically conductive member. The processor uses the determined electrical resistance of the electrically conductive member to compensate for any environmental influence on the determined electrical resistance of the tension member.

In an example embodiment having one or more features of the assembly of the preceding paragraph, the processor is configured to monitor the electrical resistance of the electrically conductive member over a selected time; determine any environmental influence on the monitored electrical resistance during the selected time; and compensate for the determined influence of temperature on the determined electrical resistance of the tension member during the selected time.

The various features and advantages of disclosed example embodiments will become apparent to those skilled in the art from the following detailed description. The drawings that accompany the detailed description can be briefly described as follows.

DETAILED DESCRIPTION

Figure 1:
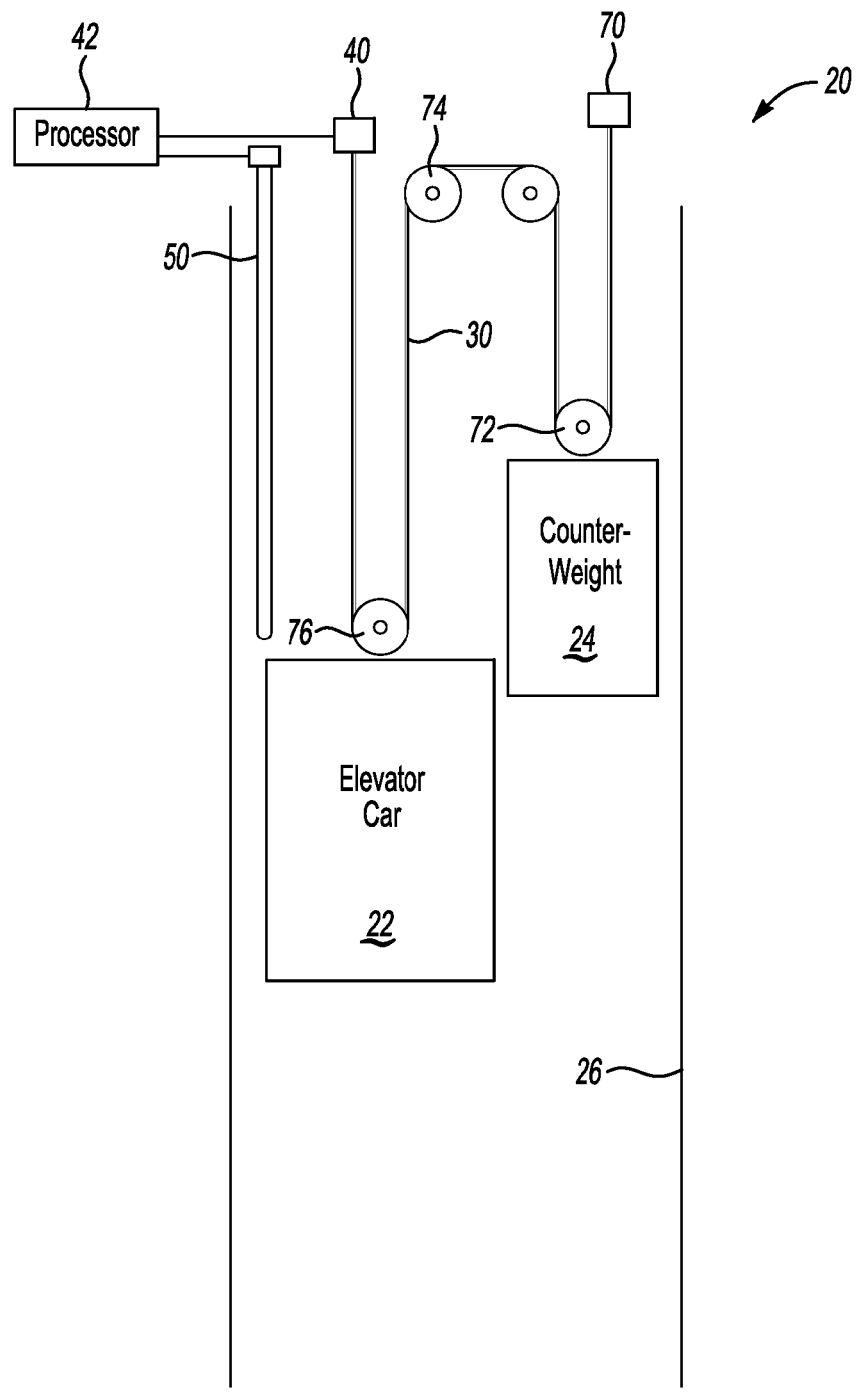
FIG. 1 schematically illustrates selected portions of an example elevator system.

FIG. 1 schematically shows selected portions of a system that could utilize the present invention, namely an elevator system 20. In this example, an elevator car 22 and a counterweight 24 are situated within a hoistway 26 in a generally known manner. One or more load bearing members 30 support the load of the elevator car 22 and facilitates movement of the elevator car 22 to provide desired elevator service. A single load bearing member 30 is illustrated for discussion purposes. Those skilled in the art will realize that multiple load bearing members may be included in a roping arrangement for suspending and moving an elevator car in a system like that schematically shown in FIG. 1.

Figure 2:
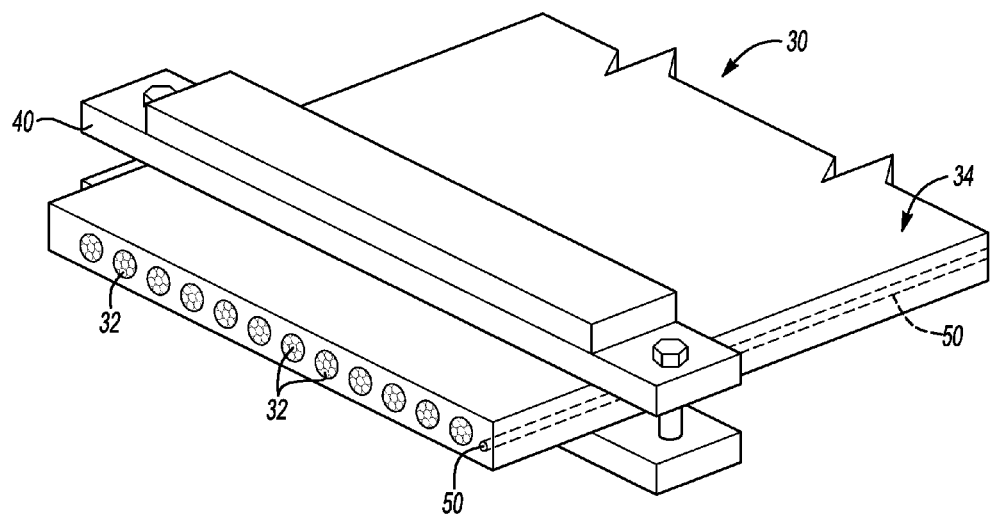
FIG. 2 illustrates an example load bearing member arrangement.

An example load bearing member 30 is shown in FIG. 2. This example comprises a belt having a plurality of tension members 32 at least partially encased within a jacket. 34. Although shown in FIG. 2 as being generally planar, the belt could have other arrangements such as a poly-V configuration. The tension members 32 in this example can be electrically conductive. In one example, the tension members 32 comprise metal, such as steel cords. The jacket 34 can be non-electrically conductive. In one example, the jacket 34 comprises a material such as a urethane. Embodiments of this invention are not necessarily limited to any particular style of load bearing member.

At least one connector 40 can facilitate an electrically conductive connection to any or all of the tension members 32 for monitoring a condition of the load bearing member 30. As shown in FIG. 1, a processor 42 determines the condition of the load bearing member 30, for example, by determining an electrical resistance of at least one of the tension members 32. In some examples, the processor 42 is programmed or configured to use one of a variety of known resistance-based monitoring techniques by which a measured electrical resistance of a tension member in an elevator load bearing member can provide an indication of a condition of that load bearing member.

As shown in FIG. 1, an electrically conductive member (ECM) 50 is provided to facilitate a more accurate determination regarding the condition of the load bearing member 30 based upon an electrical resistance of one or more tension members 32 of the load bearing member 30. The ECM 50 has a length that facilitates it being situated along a portion of the vertical path of the elector car 22 or along a portion of the height of the hoistway 26. In one example, the ECM 50 is situated along at least the top third of the height of the hoistway 26. In some examples, the ECM 50 is situated along the top two-thirds of the hoistway 26. The electrically conductive member 50 is situated along the portion of the hoistway 26 that is exposed to environmental conditions that can influence the measured resistance of a tension member 32. For example, the upper portion of a hoistway 26 typically experiences higher temperatures than lower portions of the hoistway. Higher temperatures can be associated with a change in a detected electrical resistance of a tension member 32. The ECM 50 provides information to the processor 42 that allows a processor 42 to compensate for any environmental influence on the detected or measured resistance of a tension member 32.

The placement of the ECM 50 in some examples provides temperature information for a region or area that includes a selected length or portion of the load bearing member. To determine the average position of the example load bearing member 30 in FIG. 1, a weighted average of the individual sections is used based on its length and the position of the center of each section. This is shown below:

$$Y_{AVG} = \frac{1}{L_t} \sum_{i=1}^{n} L_i Y_i$$

The length of a given section is calculated as follows:

$$L_i = Y_{i,s} - Y_{i,f}$$

The center position for a given section is calculated as follows:

$$Y_i = \frac{Y_{i,s} + Y_{i,f}}{2}$$

Combining the previous three equations yields the following:

$$Y_{AVG} = \frac{1}{2L_t} \sum_{i=1}^{n} Y_{i,s}^2 - Y_{i,f}^2$$

For a typical 2:1 roped hoistway like that shown in FIG. 1, there are four vertical segments of load bearing member 30. The first segment extends from the counterweight side termination 70 to the counterweight sheave 72. The second extends from the counterweight sheave 72 to the traction sheave 74. The third extends from the traction sheave 74 to the car sheave 76, and the last extends from the car sheave to the car side termination (at the position of connector 40 in the illustrated example). The length of the first and second segments is approximately equal to the car position (with zero car position corresponding to the car at the bottom landing) subtracted from the rise, and the length of the third and fourth segments is approximately equal to the car position. The total length can be approximated as two times the rise. Using this, the average load bearing member position can be calculated as a function of the car position as:

$$Y_{AVG} = \frac{1}{4R}[2(R^2 - (R - Y_{CAR})^2) + 2(R^2 - Y_{CAR}^2)]$$

Simplified:

$$Y_{AVG} = \frac{R}{2} + Y_{CAR} - \frac{Y_{CAR}^2}{R}$$

The average can then be found by integrating this over the full range of car positions and dividing by the rise:

$$\frac{1}{R} \int_a^R \frac{R}{2} + Y_{CAR} - \frac{Y_{CAR}^2}{R} \, dY_{CAR}$$

$$\frac{1}{R} \left[ \frac{R^2}{2} + \frac{R^2}{2} - \frac{R^2}{3} \right] = \frac{2}{3} R$$

Based on this calculation, the weighted average position of the load bearing member 30 is equal to approximately two thirds of the rise for any given hoistway. To accurately assess the temperature of the environment containing the tension members 32, the example ECM 50 would be centered approximately ⅔ of the way up the hoistway 26.

The ECM 50 has a resistance for a given ambient temperature, in other words a baseline resistance. The processor 42 monitors the electrical resistance of the ECM 50 over a selected time. The processor 42 is configured to detect any changes in that electrical resistance and recognize those as being the result of an environmental influence, such as a temperature change. The processor 42 then uses such information to compensate for such an influence on the determined electrical resistance of a tension member 32 during that same time. For example, if the resistance of the ECM 50 increases during a measurement period, the processor 42 is able to compensate for any corresponding increase in a resistance of a tension member 32 during that measurement period. Without the separate ECM 50, the system would not likely be able to determine whether the rise in the resistance of the tension member 32 during that measurement period was due exclusively to a change in a condition of that tension member or some environmental influence such as an increase in temperature within the hoistway. The ECM 50 allows the processor 42 to mitigate or even isolate environmental influences on resistance measurements to increase the accuracy associated with a resistance-based inspection technique for an elevator load bearing member.

In some examples, the ECM 50 is received on or in the load bearing member 30. In the example of FIG. 2, the ECM 50 is at least partially received within the jacket 34 of the load bearing member 30. As can be appreciated from the illustration, a plurality of tension members 32 are situated within the jacket 34. The ECM 50 is closer to an edge of the jacket 34 than any of the tension members 32. Positioning the ECM 50 in this manner reduces any load that the ECM 50 may experience during elevator system operation. The majority of the load on the load bearing member 30 will be carried by the tension members 32 that are more centrally located within the load bearing member 30.

The ECM 50 in the example of FIG. 2 is situated within the jacket 34 so that the ECM 50 is not subject to the bending loads or other stresses experienced by the tension members 32 as such loads may tend to influence or change the resistance of the ECM 50. One example includes a wavy or coiled wire that is more flexible than the tension members 32. Another example includes the ECM 50 having a higher wire count compared to the number of wires within the tension members 32. In one such example, the ECM 50 may have a similar overall diameter compared to the tension members 32 that the individual wires of which the ECM 50 is made are thinner than the individual strands used for making the tension members 32. Another example utilizes a material that is different than the material used for the tension members 32 so that the ECM 50 has a different response to any bending loads on the ECM 50 will not have the same affect (e.g., a reduction in cross-sectional area or broken wires) as such loads may have on the tension members 32. Another example includes using shorter lay lengths of wires within the ECM 50 compared to the lay lengths of the strands within the tension members 32. Each of these examples provides a way of reducing or avoiding potential mechanical wear on the ECM 50 to avoid any influence on or change in the electrical resistance of the ECM 50.

Another feature of the example of FIG. 2 is that the ECM 50 is selected to have a stiffness that is less than a stiffness of the tension members 32. This further avoids any influence of any potential load on the ECM 50 that might tend to influence the resistance of the ECM 50.

Figure 3:
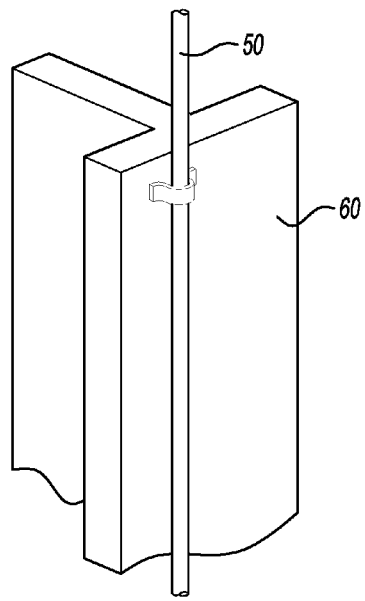
FIG. 3 illustrates an example placement of an electrically conductive member.

FIG. 3 schematically illustrates another arrangement in which the ECM 50 is received against a surface on a guiderail 60. This example provides another possible placement for the ECM 50 within the hoistway 26.

Regardless of where the ECM 50 is situated within the system 20, the ECM 50 is not subject to the load of the tension members 32. The ECM 50 is situated in a manner that avoids load on the ECM 50 that would influence or change the resistance of the ECM 50 to avoid any change in the resistance of the ECM 50 that is caused by something other than temperature. Minimizing or avoiding any resistance-altering load on the ECM 50 allows for isolating any environmental influence on electrical resistance determinations.

One feature of the disclosed examples is that the ECM 50 provides for determining the influence of environmental conditions such as temperature on the electrical resistance of the tension member 32. The ECM 50 is disposed along a portion of the length of the travel of the elevator car or the height of the hoistway such that the ECM 50 experiences the same or very similar temperature differences that correspondingly located portions of the load bearing member 30 experience during a resistance monitoring period. The ECM 50 provides superior analysis capabilities compared to a plurality of temperature sensors that may be positioned along the hoistway 26. The temperature of the ECM 50 more closely tracks the actual temperature of the tension members 32 and, therefore, resistance information regarding the ECM 50 provides a superior indication of how environmental conditions within the hoistway may influence a monitored resistance of a tension member.

In one example, the ECM 50 comprises an electrically conductive wire having an insulating coating. The material of the ECM 50 may be the same as the material used for making the tension members 32 but it need not be the same. Some examples include an ECM 50 comprising a material that has a relatively high base line resistance to provide increased accuracy for detecting changes in resistance due to environmental influences such as moisture or temperature.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A system, comprising:
  a moveable mass;
  a load bearing member including at least one electrically conductive tension member that supports a load associated with moving the mass;
  an electrically conductive member situated along a selected portion of a path of the tension member such that the electrically conductive member is not subject to the load on the tension member; and
  a processor that is configured to
    determine an electrical resistance of the tension member as an indicator of a condition of the tension member,
    determine an electrical resistance of the electrically conductive member, and
    use the determined electrical resistance of the electrically conductive member to compensate for any environmental influence on the determined electrical resistance of the tension member.

2. The system of claim 1, wherein the processor is configured to
  monitor the electrical resistance of the electrically conductive member over a selected time;
  determine any environmental influence on monitored electrical resistance during the selected time; and
  compensate for the determined influence on the determined electrical resistance of the tension member during the selected time.

3. The system of claim 2, wherein the processor is configured to
  determine a baseline electrical resistance of the electrically conductive member during a first measurement period;
  determine whether the electrical resistance of the electrically conductive member differs from the baseline electrical resistance during a second measurement period;
  determine an influence of temperature on the electrical resistance during the second measurement period;
  determine the electrical resistance of the tension member during the second measurement period; and
  determine the condition of the tension member during the second measurement period based on the determined electrical resistance of the tension member during the second measurement period and the determined influence of temperature during the second measurement period.

4. The system of claim 1, wherein the electrically conductive member is situated along a wall of a hoistway.

5. The system of claim 1, wherein the electrically conductive member is at least partially secured to a guiderail.

6. The system of claim 1, wherein the electrically conductive member is supported on or in the load bearing member.

7. The system of claim 6, wherein the load bearing member comprises a jacket and the electrically conductive member is received within the jacket.

8. The system of claim 7, wherein the load bearing member comprises a plurality of tension members within the jacket and the electrically conductive member is closer to an edge of the jacket than any of the tension members.

9. The system of claim 6, wherein the tension member has a first stiffness and the electrically conductive member has a second, lesser stiffness.

10. A method of monitoring a condition of a load bearing member in a system, the load bearing member including at least one electrically conductive tension member, the method comprising the steps of:
  situating an electrically conductive member along a desired length of a path of the load bearing member, so that the electrically conductive member is not subject to a load on the tension member;

determining an electrical resistance of the tension member as an indicator of a condition of the tension member;

determining an electrical resistance of the electrically conductive member; and using the determined electrical resistance of the electrically conductive member to compensate for any environmental influence on the determined electrical resistance of the tension member.

11. The method of claim 10, comprising monitoring the electrical resistance of the electrically conductive member over a selected time;

determining any environmental influence on the monitored electrical resistance during the selected time; and compensating for the determined influence on the determined electrical resistance of the tension member during the selected time.

12. The method of claim 11, comprising determining a baseline electrical resistance of the electrically conductive member during a first measurement period;

determining whether the electrical resistance of the electrically conductive member differs from the baseline electrical resistance during a second measurement period;

determining an influence of temperature on the electrical resistance during the second measurement period;

determining the electrical resistance of the tension member during the second measurement period; and determining the condition of the tension member during the second measurement period based on the determined electrical resistance of the tension member during the second measurement period and the determined influence of temperature during the second measurement period.

13. The method of claim 10, wherein the situating comprises placing the electrically conductive member along a wall of an elevator hoistway.

14. The method of claim 10, wherein the situating comprises securing the electrically conductive member at least partially to a guiderail in an elevator hoistway.

15. The method of claim 10, wherein the situating comprises including the electrically conductive member on or in the load bearing member.

16. The method of claim 15, wherein the load bearing member comprises a jacket and the electrically conductive member is received within the jacket.

17. The method of claim 16, wherein the load bearing member comprises a plurality of tension members within the jacket and the electrically conductive member is closer to an edge of the jacket than any of the tension members.

18. The method of claim 15, wherein the tension member has a first stiffness and the electrically conductive member has a second, lesser stiffness.

19. An assembly for monitoring a condition of a load bearing member, comprising:

an electrically conductive member having a length that allows for the conductive member to be situated along a desired portion of a path of the load bearing member;

a connector configured to make an electrically conductive connection with at least one tension member in the load bearing member; and a processor that is configured to determine an electrical resistance of the tension member as an indicator of a condition of the tension member, determine an electrical resistance of the electrically conductive member, and use the determined electrical resistance of the electrically conductive member to compensate for any environmental influence on the determined electrical resistance of the tension member.

20. The assembly of claim 19, wherein the processor is configured to monitor the electrical resistance of the electrically conductive member over a selected time;

determine any environmental influence on the monitored electrical resistance during the selected time; and compensate for the determined influence of temperature on the determined electrical resistance of the tension member during the selected time.

* * * * *

UNITED STATES PATENT AND TRADEMARK OFFICE
CERTIFICATE OF CORRECTION

| | |
|---|---|
| PATENT NO. | : 9,618,409 B2 |
| APPLICATION NO. | : 14/409485 |
| DATED | : April 11, 2017 |
| INVENTOR(S) | : Michael Garfinkel, Peter Keyo and Peter Liaskas |

It is certified that error appears in the above-identified patent and that said Letters Patent is hereby corrected as shown below:

In the Claims

In Claim 20, Column 10, Line 38; after "determined" replace "influence of temperature" with --environmental influence--

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*